US008244432B2

(12) United States Patent
Kogure et al.

(10) Patent No.: US 8,244,432 B2
(45) Date of Patent: Aug. 14, 2012

(54) ROAD-SURFACE FRICTION-COEFFICIENT ESTIMATING DEVICE

(75) Inventors: Masaru Kogure, Tokyo (JP); Koji Matsuno, Tokyo (JP); Takeshi Yoneda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 958 days.

(21) Appl. No.: 12/081,245

(22) Filed: Apr. 11, 2008

(65) Prior Publication Data

US 2008/0262692 A1 Oct. 23, 2008

(30) Foreign Application Priority Data

Apr. 18, 2007 (JP) ................................. 2007-109622

(51) Int. Cl.
*B62D 6/00* (2006.01)
(52) U.S. Cl. ................ 701/41; 701/65; 701/70; 701/90; 701/80; 180/197; 340/425.5; 340/441
(58) Field of Classification Search .................... 701/23, 701/65, 70, 85, 87, 90, 93, 409; 340/425.5, 340/441; 180/197
See application file for complete search history.

(56) References Cited

U.S. PATENT DOCUMENTS

| 5,070,960 | A | * | 12/1991 | Nobumoto et al. | ........... | 180/197 |
| 5,742,917 | A |   | 4/1998  | Matsuno | | |
| 6,015,192 | A | * | 1/2000  | Fukumura | ..................... | 303/140 |
| 6,155,377 | A | * | 12/2000 | Tokunaga et al. | ............. | 180/446 |
| 6,161,641 | A | * | 12/2000 | Fukumura et al. | ............ | 180/197 |
| 6,925,371 | B2 | * | 8/2005 | Yasui et al. | ...................... | 701/72 |
| 7,171,296 | B2 | * | 1/2007 | Kato et al. | ....................... | 701/70 |
| 7,315,777 | B2 | * | 1/2008 | Ono | ................ | 701/70 |
| 2006/0080016 | A1 | * | 4/2006 | Kasahara et al. | ............... | 701/41 |

FOREIGN PATENT DOCUMENTS

| JP | 8-2274 | 1/1996 |
| JP | 2000-71968 | 3/2000 |

* cited by examiner

*Primary Examiner* — Thomas Tarcza
*Assistant Examiner* — Adam Tissot
(74) *Attorney, Agent, or Firm* — Smith, Gambrell & Russell, LLP

(57) ABSTRACT

A road-surface friction-coefficient estimating device compares a rack-thrust-force deviation value with a preliminarily set maximum-value-determination threshold value. If the rack-thrust-force deviation value is above the maximum-value-determination threshold value, the device determines that tires are slipping, and sets a front-wheel friction-circle utilization rate in that state as a road-surface friction coefficient. If the rack-thrust-force deviation value is below the maximum-value-determination threshold value, the device refers to a preliminarily set map to determine a restoring speed at which the road-surface friction coefficient is to be restored to 1.0 based on a vehicle speed and a front-wheel slip angle. While restoring the road-surface friction coefficient at the restoring speed, the device calculates and outputs the road-surface friction coefficient.

17 Claims, 5 Drawing Sheets

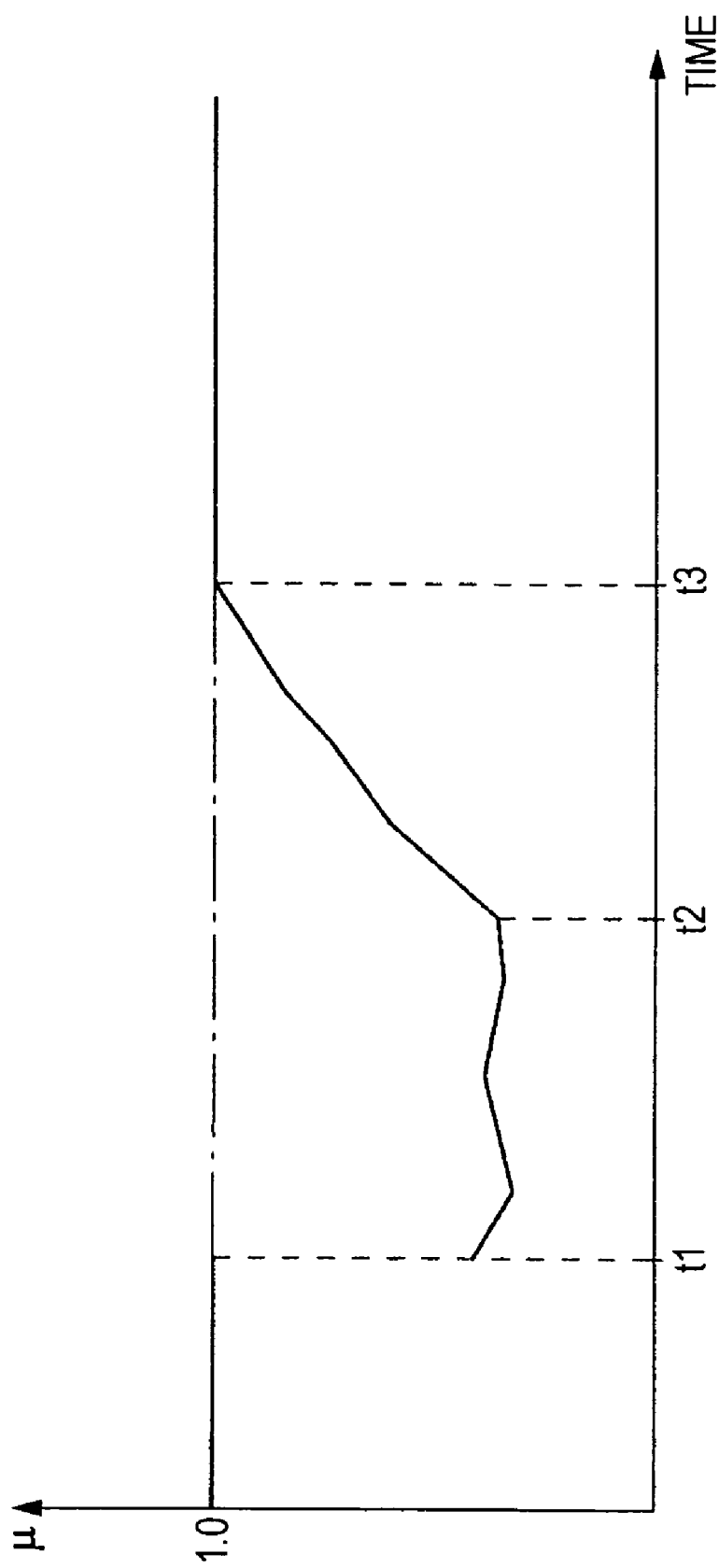

ROAD-SURFACE FRICTION-COEFFICIENT ESTIMATING DEVICE

CROSS REFERENCES TO RELATED APPLICATIONS

The disclosure of Japanese Patent Application No. 2007-109622 filed on Apr. 18, 2007 including the specifications, drawings, and abstracts are incorporated by references herein.

BACKGROUND OF THE INVENTION

1. Field of the Invention

The present invention relates to a road-surface friction-coefficient estimating device of a vehicle estimating a road-surface friction coefficient over a broad driving range.

2. Description of the Related Art

In recent years, there have been developed and put in practical use various control technologies for vehicles, such as traction control, braking-force control, and torque-distribution control. These technologies generally utilize a road-surface friction coefficient for the calculation or correction of required control parameters. In order to perform the control properly, it is necessary to estimate a road-surface friction coefficient with high accuracy.

With regard to technologies for estimating a road-surface friction coefficient, the present applicant also has proposed in Japanese Unexamined Patent Application Publication No. 8-2274 a technology for estimating a road-surface friction coefficient from, for example, a steering angle, a vehicle speed, and a yaw rate using an adaptive control theory. According to this technology, a yaw movement or lateral movement of a vehicle is modeled, and is compared with a yaw movement or lateral movement of an actual vehicle. In accordance with this comparison, the tire characteristics are estimated every second so that a road-surface friction coefficient can be estimated.

However, in the above-mentioned device, there are cases where estimation of a road-surface friction coefficient is not possible such as when a steering angle is at 0°. In that case, even if the road condition has changed from a low μ road to a high μ road, the previously estimated value of the road-surface friction coefficient for the low μ road will still be used on the high μ road. This makes it difficult to perform vehicle behavior control with high accuracy. For example, in the case of traction control where torque is controlled by calculating an optimum grip force using an estimated value of a road-surface friction coefficient, an acceleration control amount that corresponds to a low μ road will be unfavorably set even though the vehicle is actually on a high μ road. In this case, there is a possibility that the vehicle will not exhibit its original acceleration performance.

SUMMARY OF THE INVENTION

In view of the circumstances described above, it is an object of the present invention to provide a road-surface friction-coefficient estimating device that can appropriately set a road-surface friction coefficient even in a condition where estimation of a road-surface friction coefficient is difficult, so that the potential that vehicle behavior control has can be exhibited to a maximum extent.

The present invention provides a road-surface friction-coefficient estimating device including a vehicle-speed detecting unit configured to detect a vehicle speed; a vehicle-wheel slip-angle detecting unit configured to detect a slip angle of a wheel; a restoring-speed setting unit configured to set a restoring speed at which a road-surface friction coefficient is to be restored to a preliminarily set value based on the vehicle speed and the slip angle of the wheel; and a road-surface friction-coefficient estimating unit configured to estimate the road-surface friction coefficient by allowing the road-surface friction coefficient to be restored to the set value at the restoring speed.

According to the road-surface friction-coefficient estimating device of the present invention, a road-surface friction coefficient can be appropriately set even in a condition where estimation of a road-surface friction coefficient is difficult, whereby the potential that vehicle behavior control has can be exhibited to a maximum extent.

BRIEF DESCRIPTION OF THE DRAWINGS

FIG. 6 is a timing diagram that shows an example of road-surface friction-coefficient estimation according to this embodiment.

DESCRIPTION OF THE PREFERRED EMBODIMENTS

Embodiments of the present invention will now be described with reference to the drawings.

Figure 1:
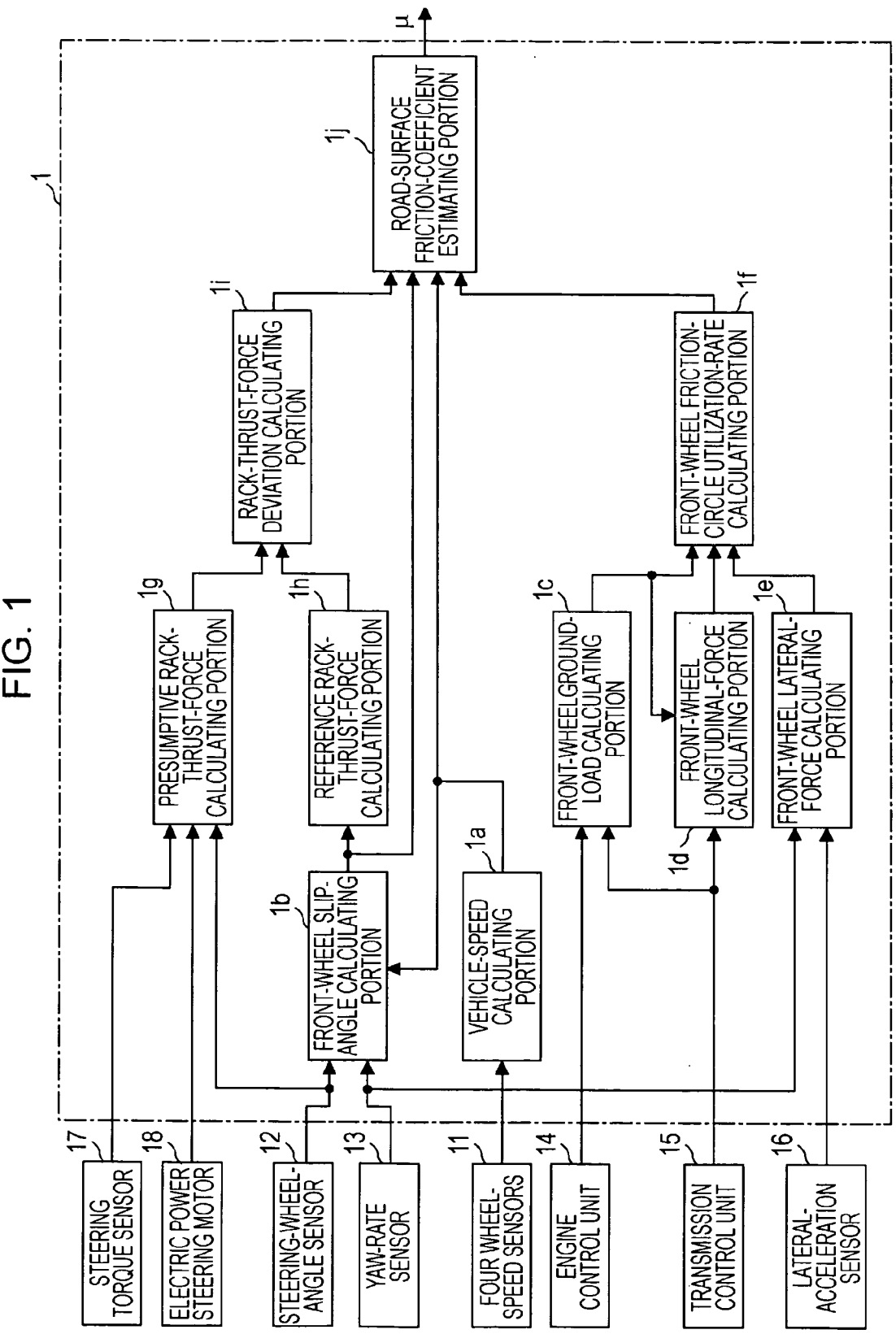
FIG. 1 is a functional block diagram of a road-surface friction-coefficient estimating device.
Figure 2:
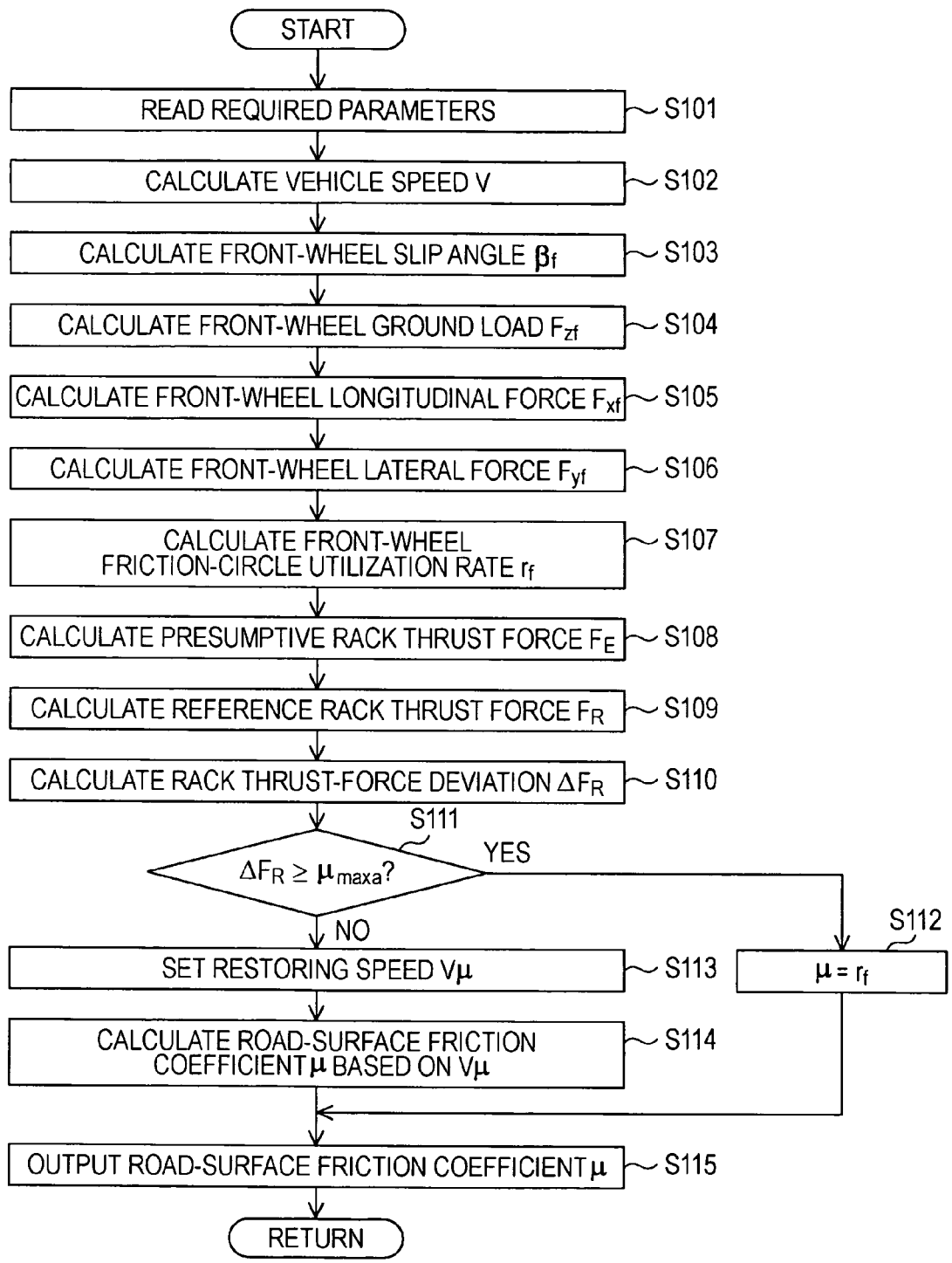
FIG. 2 is a flow chart of a road-surface friction-coefficient estimating program.
Figure 3:
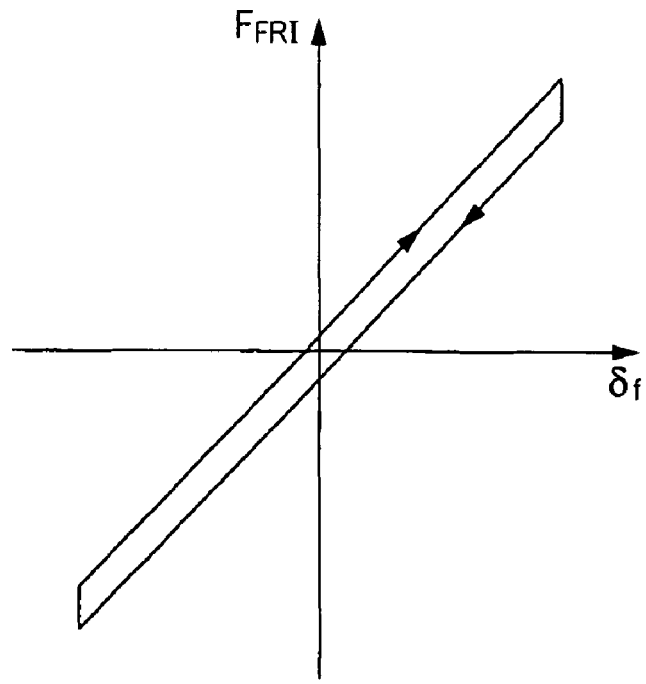
FIG. 3 is a diagram illustrating steering-angle versus steering-torque characteristics.
Figure 4:
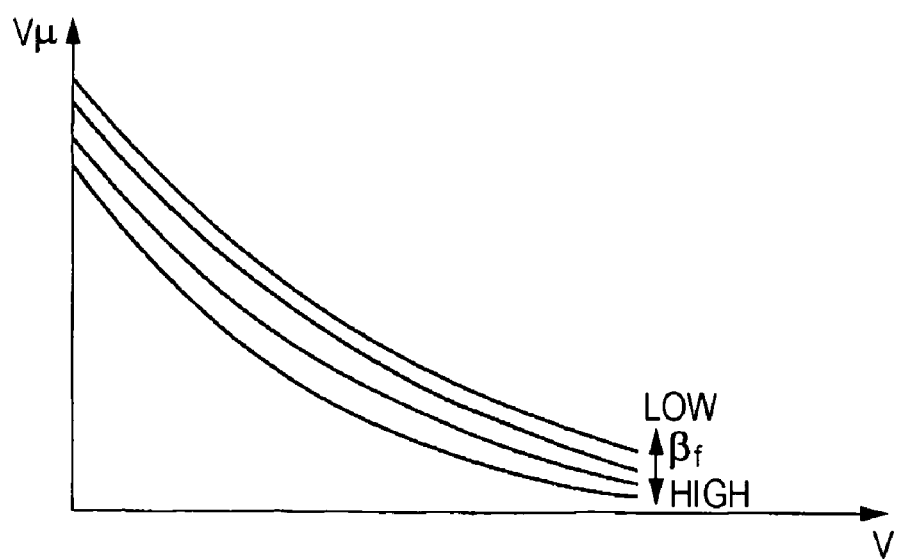
FIG. 4 is a characteristic diagram of a restoring speed set in accordance with a vehicle speed and a front-wheel slip angle.

FIGS. 1 to 6 illustrate an embodiment of the present invention. Specifically, FIG. 1 is a functional block diagram of a road-surface friction-coefficient estimating device, FIG. 2 is a flow chart of a road-surface friction-coefficient estimating program, FIG. 3 is a diagram illustrating steering-angle versus steering-torque characteristics, FIG. 4 is a characteristic diagram of a restoring speed set in accordance with a vehicle speed and a front-wheel slip angle, FIG. 5A illustrates a relationship between a steering-stability capacity and a vehicle speed, FIG. 5B illustrates a relationship between a steering-stability capacity and a slip angle, and FIG. 6 is a timing diagram that shows an example of road-surface friction-coefficient estimation according to this embodiment. In this embodiment, a vehicle equipped with the road-surface friction-coefficient estimating device is directed to a four-wheel-drive vehicle having a center differential as an example. In this vehicle, a limited-slip differential clutch (tightening torque $T_{LSD}$) allows a longitudinal driving-force distribution to be adjustable on the basis of a base torque distribution $R_{f\_cd}$ by the center differential.

Referring to FIG. 1, reference numeral 1 denotes a road-surface friction-coefficient estimating device installed in a vehicle for estimating a road-surface friction coefficient. The road-surface friction-coefficient estimating device 1 is connected to wheel-speed sensors 11 for four individual wheels, a steering-wheel-angle sensor 12, a yaw-rate sensor 13, an engine control unit 14, a transmission control unit 15, a lateral acceleration sensor 16, a steering-torque sensor 17, and an electric power steering motor 18, and receives therefrom signals indicating wheel speeds $\omega_{fl}$, $\omega_{fr}$, $\omega_{rl}$, and $\omega_{rr}$ of the individual wheels (the additional characters "fl", "fr", "rl", and "rr" respectively indicating a front left wheel, a front right wheel, a rear left wheel, and a rear right wheel), a steering-wheel angle $\theta_H$, a yaw rate $\gamma$, an engine torque $T_{eg}$, an engine speed $N_e$, a main transmission gear ratio i, a turbine speed $N_t$ of a torque converter, a tightening torque $T_{LSD}$ of a limited-slip differential clutch, a lateral acceleration $(d^2y/dt^2)$, a driver steering force $F_d$, and an assist force $F_{EPS}$ by electric power steering.

As shown in FIG. 1, based on these input signals, the road-surface friction-coefficient estimating device 1 executes a road-surface friction-coefficient estimating program to be described hereinafter so as to estimate and output a road-surface friction coefficient $\mu$. Specifically, the road-surface friction-coefficient estimating device 1 mainly includes a vehicle-speed calculating portion 1a, a front-wheel slip-angle calculating portion 1b, a front-wheel ground-load calculating portion 1c, a front-wheel longitudinal-force calculating portion 1d, a front-wheel lateral-force calculating portion 1e, a front-wheel friction-circle utilization-rate calculating portion 1f, a presumptive rack-thrust-force calculating portion 1g, a reference rack-thrust-force calculating portion 1h, a rack-thrust-force deviation calculating portion 1i, and a road-surface friction-coefficient estimating portion 1j.

The vehicle-speed calculating portion 1a receives the wheel speeds $\omega_{fl}$, $\omega_{fr}$, $\omega_{rl}$, and $\omega_{rr}$ of the individual wheels from the wheel-speed sensors 11, calculates an average of these values to determine a vehicle speed $V(=\omega_{fl}+\omega_{fr}+\omega_{rl}+\omega_{rr})/4$, and then outputs the vehicle speed V to the front-wheel slip-angle calculating portion 1b and the road-surface friction-coefficient estimating portion 1j. In other words, the vehicle-speed calculating portion 1a is provided as vehicle-speed detecting unit.

The front-wheel slip-angle calculating portion 1b receives the steering-wheel angle $\theta_H$ from the steering-wheel-angle sensor 12, the yaw rate $\gamma$ from the yaw-rate sensor 13, and the vehicle speed V from the vehicle-speed calculating portion 1a. Subsequently, the front-wheel slip-angle calculating portion 1b calculates a front-wheel slip angle $\beta_f$ on the basis of a driving model of the vehicle as will be described hereinafter, and then outputs the front-wheel slip angle $\beta_f$ to the reference rack-thrust-force calculating portion 1h and the road-surface friction-coefficient estimating portion 1j. In other words, the front-wheel slip-angle calculating portion 1b is provided as vehicle-wheel slip-angle detecting unit.

An equation of motion related to a translational movement of the vehicle in the lateral direction thereof is expressed as follows:

$$2 \cdot C_f + 2 \cdot C_r = m \cdot (d^2y/dt^2) \tag{1}$$

where $C_f$ indicates a cornering force of each of the front wheels, $C_r$ indicates a cornering force of each of the rear wheels, and m indicates a vehicle mass.

On the other hand, an equation of motion related to a rotational movement around the center of gravity is expressed as follows:

$$2 \cdot C_f \cdot L_f - 2 \cdot C_r \cdot L_r = I_z \cdot (d\gamma/dt) \tag{2}$$

where $L_f$ indicates a distance between the center of gravity and the front axle, $L_r$ indicates a distance between the center of gravity and the rear axle, $I_z$ indicates a yaw moment of inertia of the vehicle body, and $(d\gamma/dt)$ indicates yaw-angle acceleration.

If a vehicle slip angle is indicated by $\beta$ and a vehicle slip-angle rate is indicated by $(d\beta/dt)$, the lateral acceleration $(d^2y/dt^2)$ can be expressed as follows:

$$(d^2y/dt^2) = V \cdot ((d\beta/dt) + \gamma) \tag{3}$$

Accordingly, the aforementioned equation (1) becomes the following equation (4):

$$2 \cdot C_f + 2 \cdot C_r = m \cdot V \cdot ((d\beta/dt) + \gamma) \tag{4}$$

Although a cornering force responds to a lateral slip angle of a tire by about a first-order time lag, a cornering force linearized by ignoring such a time lag and using an equivalent cornering power including suspension characteristics and tire characteristics can be expressed as follows:

$$C_f = K_f \cdot \beta_f \tag{5}$$

$$C_r = K_r \cdot \beta_r \tag{6}$$

where $K_f$ indicates a front-wheel equivalent cornering power, $K_r$ indicates a rear-wheel equivalent cornering power, $\beta_f$ indicates a front-wheel slip angle, and $\beta_r$ indicates a rear-wheel slip angle.

In view of the effects of the roll or the suspension in the equivalent cornering power $K_f$ and equivalent cornering power $K_r$, the slip angles $\beta_f$ and $\beta_r$ of the front and rear wheels can be simplified as follows using the equivalent cornering power $K_f$ and equivalent cornering power $K_r$:

$$\beta_f = \delta_f - (\beta + L_f \cdot \gamma / V) \tag{7}$$
$$= (\theta_H / n) - (\beta + L_f \cdot \gamma / V)$$

$$\beta_r = \delta_r - (\beta - L_r \cdot \gamma / V) \tag{8}$$

where $\delta_f$ indicates a front-wheel steering angle, $\delta_r$ indicates a rear-wheel steering angle, and n indicates a steering gear ratio.

Summarizing the aforementioned equations of motion, the following equation of state (9) can be obtained:

$$(dx(t)/dt) = A \cdot x(t) + B \cdot u(t) \tag{9}$$

$$x(t) = [\beta \quad \gamma]^T$$

$$u(t) = [\theta_H \quad \delta_r]^T$$

$$A = \begin{bmatrix} a11 & a12 \\ a21 & a22 \end{bmatrix}$$

$$B = \begin{bmatrix} b11 & b12 \\ b21 & b22 \end{bmatrix}$$

$a11 = -2 \cdot (K_f + K_r)/(m \cdot V)$
$a12 = -1.0 - 2 \cdot (L_f \cdot K_f - L_r \cdot K_r)/(m \cdot V^2)$
$a21 = -2 \cdot (L_f \cdot K_f - L_r \cdot K_r)/I_z$
$a22 = -2 \cdot (L_f^2 \cdot K_f + L_r^2 \cdot K_r)/(I_z \cdot V)$
$b11 = 2 \cdot K_f/(m \cdot V \cdot n)$
$b12 = 2 \cdot K_r/(m \cdot V)$
$b21 = 2 \cdot L_f \cdot K_f/I_z$
$b22 = -2 \cdot L_r \cdot K_r/I_z$ In other words, a vehicle slip angle $\beta$ is calculated by solving the aforementioned equation (9), and the calculated vehicle slip angle $\beta$ is substituted into the aforementioned equation (7) to determine a front-wheel slip angle $\beta_f$.

The front-wheel ground-load calculating portion 1c receives the engine torque $T_{eg}$ and the engine speed $N_e$ from the engine control unit 14, and also receives the main transmission gear ratio i and the turbine speed $N_t$ of the torque converter from the transmission control unit 15.

The front-wheel ground-load calculating portion 1c then calculates a front-wheel ground load $F_{zf}$ from the following equation (10) and outputs the front-wheel ground load $F_{zf}$ to the front-wheel longitudinal-force calculating portion $1d$ and the front-wheel friction-circle utilization-rate calculating portion $1f$.

$$F_{zf} = W_f - ((m \cdot A_x \cdot h)/L) \quad (10)$$

In this case, $W_f$ indicates a front-wheel static load, h indicates the height of the center of gravity, L indicates a wheel base, and $A_x$ indicates longitudinal acceleration ($=F_x/m$). $F_x$ in the arithmetic expression of the longitudinal acceleration $A_x$ indicates a total driving force, and can be calculated from, for example, the following equation (11). The total driving force $F_x$ is also output to the front-wheel longitudinal-force calculating portion $1d$.

$$F_x = T_t \cdot \eta \cdot i_f / R_t \quad (11)$$

In this case, $\eta$ indicates a transmission efficiency of a driving system, $i_f$ indicates a final gear ratio, and $R_t$ indicates a tire radius. Furthermore, $T_t$ indicates a transmission output torque, which can be calculated from, for example, the following equation (12). The transmission output torque $T_t$ is also output to the front-wheel longitudinal-force calculating portion $1d$.

$$T_t = T_{eg} \cdot t \cdot i \quad (12)$$

In this case, t indicates a torque ratio of the torque converter, which is determined by referring to a preliminarily set map that shows a relationship between a rotational speed ratio e ($=N_t/N_e$) of the torque converter and a torque ratio of the torque converter.

The front-wheel longitudinal-force calculating portion $1d$ receives the tightening torque $T_{LSD}$ of the limited-slip differential clutch from the transmission control unit 15, and also receives the front-wheel ground load $F_{zf}$, the total driving force $F_x$, and the transmission output torque $T_t$ from the front-wheel ground-load calculating portion $1c$. The front-wheel longitudinal-force calculating portion $1d$ then calculates a front-wheel longitudinal force $F_{xf}$ in accordance with, for example, a procedure to be described hereinafter, and outputs the front-wheel longitudinal force $F_{xf}$ to the front-wheel friction-circle utilization-rate calculating portion $1f$.

An example of the procedure for calculating a front-wheel longitudinal force $F_{xf}$ will be described below.

First, a front-wheel load distribution ratio $W_{R\_f}$ is calculated from the following equation (13):

$$W_{R\_f} = F_{zf}/W \quad (13)$$

where W indicates a vehicle weight ($=m \cdot G$; G being gravitational acceleration).

Then, a minimum front-wheel longitudinal torque $T_{fmin}$ and a maximum front-wheel longitudinal torque $T_{fmax}$ are calculated from the following equations (14) and (15):

$$T_{fmin} = T_t \cdot R_{f\_cd} - T_{LSD} (\geq 0) \quad (14)$$

$$T_{fmax} = T_t \cdot R_{f\_cd} + T_{LSD} (\geq 0) \quad (15)$$

Subsequently, a minimum front-wheel longitudinal force $F_{xfmin}$ and a maximum front-wheel longitudinal force $F_{xfmax}$ are calculated from the following equations (16) and (17):

$$F_{xfmin} = T_{fmin} \cdot \eta \cdot i_f / R_t \quad (16)$$

$$F_{xfmax} = T_{fmax} \cdot \eta \cdot i_f / R_t \quad (17)$$

The conditions are determined in the following manner.

When $W_{R\_f} \leq F_{xfmin}/F_x$, it is determined that limited-slip differential torque is increasing at the rear wheels, thereby setting a determination value I to 1.

When $W_{R\_f} \geq F_{xfmax}/F_x$, it is determined that limited-slip differential torque is increasing at the front wheels, thereby setting a determination value I to 3.

In cases other than the above, a normal condition is confirmed, thereby setting a determination value I to 2.

In accordance with the determination value I, a front-wheel longitudinal force $F_{xf}$ is calculated as follows:

When I=1:

$$F_{xf} = T_{fmin} \cdot \eta \cdot i_f / R_t \quad (18)$$

When I=2:

$$F_{xf} = F_x \cdot W_{R\_f} \quad (19)$$

When I=3:

$$F_{xf} = F_{xfmax} \cdot \eta \cdot i_f / R_t \quad (20)$$

The front-wheel lateral-force calculating portion $1e$ receives the yaw rate $\gamma$ from the yaw-rate sensor 13 and the lateral acceleration ($d^2y/dt^2$) from the lateral acceleration sensor 16. The front-wheel lateral-force calculating portion $1e$ then calculates a front-wheel lateral force $F_{yf}$ from the following equation (21) and outputs the front-wheel lateral force $F_{yf}$ to the front-wheel friction-circle utilization-rate calculating portion $1f$.

$$F_{yf} = (I_z \cdot (d\gamma/dt) + m \cdot (d^2y/dt^2) \cdot L_r)/L \quad (21)$$

In other words, in this embodiment, the front-wheel ground-load calculating portion $1c$, the front-wheel longitudinal-force calculating portion $1d$, and the front-wheel lateral-force calculating portion $1e$ are provided as a tire-force estimating portion in road-surface friction-coefficient estimating unit.

The front-wheel friction-circle utilization-rate calculating portion $1f$ receives the front-wheel ground load $F_{zf}$ from the front-wheel ground-load calculating portion $1c$, the front-wheel longitudinal force $F_{xf}$ from the front-wheel longitudinal-force calculating portion $1d$, and the front-wheel lateral force $F_{yf}$ from the front-wheel lateral-force calculating portion $1e$. The front-wheel friction-circle utilization-rate calculating portion $1f$ then calculates a front-wheel friction-circle utilization rate $r_f$ from the following equation (22), and outputs the front-wheel friction-circle utilization rate $r_f$ to the road-surface friction-coefficient estimating portion $1j$. In other words, the front-wheel friction-circle utilization-rate calculating portion $1f$ is provided as a friction-circle utilization-rate calculating portion in the road-surface friction-coefficient estimating unit.

$$r_f = (F_{xf}^2 + F_{yf}^2)^{1/2}/F_{zf} \quad (22)$$

The presumptive rack-thrust-force calculating portion $1g$ receives the steering-wheel angle $\theta_H$ from the steering-wheel-angle sensor 12, the driver steering force $F_d$ from the steering-torque sensor 17, and the electric-power-steering assist force $F_{EPS}$ from the electric power steering motor 18. The presumptive rack-thrust-force calculating portion $1g$ then calculates a presumptive rack thrust force $F_E$ from the following equation (23) and outputs the presumptive rack thrust force $F_E$ to the rack-thrust-force deviation calculating portion $1i$. In other words, the presumptive rack-thrust-force calculating portion $1g$ is provided as a presumptive rack-thrust-force estimating portion in the road-surface friction-coefficient estimating unit.

$$F_E = F_d + F_{EPS} - F_{FRI} \quad (23)$$

In this case, $F_{FRI}$ indicates a force generated as a result of, for example, friction in a steering system, and is set by referring to, for example, a preliminarily set map. An example of this map is shown in FIG. 3. In this example, $F_{FRI}$ is obtained from steering-angle versus steering-torque characteristics and is determined using a hysteresis function based on a steering angle and a steering-angle rate. Alternatively, $F_{FRI}$ can be determined with higher accuracy by switching the characteristic map shown in FIG. 3 to a map created in view of a value such as the lateral acceleration ($d^2y/dt^2$) or the driver steering force $F_d$ (specifically, by changing the characteristics in the map shown in FIG. 3 to characteristics in which the hysteresis gap between the increasing side and the decreasing side becomes wider as the lateral acceleration ($d^2y/dt^2$) or the driver steering force $F_d$ increases). By taking into consideration the force $F_{FRI}$ in this manner, a presumptive rack thrust force $F_E$ can be accurately calculated not only for when the steering wheel is being turned, but also for when the steering wheel is being returned to its initial position. Accordingly, this allows for estimation of a road-surface friction coefficient $\mu$ over a broad range.

The reference rack-thrust-force calculating portion 1h receives the front-wheel slip angle $\beta_f$ of from the front-wheel slip-angle calculating portion 1b. The reference rack-thrust-force calculating portion 1h then calculates a reference rack thrust force $F_R$ from the following equation (24) and outputs the reference rack thrust force $F_R$ to the rack-thrust-force deviation calculating portion 1i. In other words, the reference rack-thrust-force calculating portion 1h is provided as a reference rack-thrust-force estimating portion in the road-surface friction-coefficient estimating unit.

$$F_R = -2 \cdot K_f \cdot ((\zeta_c + \zeta_n)L_n) \cdot \beta_f \tag{24}$$

In this case, $\zeta_c$ indicates a caster trail, $\zeta_n$ indicates a pneumatic trail, and $L_n$ indicates a knuckle arm length.

The rack-thrust-force deviation calculating portion 1i receives the presumptive rack thrust force $F_E$ from the presumptive rack-thrust-force calculating portion 1g and the reference rack thrust force $F_R$ from the reference rack-thrust-force calculating portion 1h. The rack-thrust-force deviation calculating portion 1i then calculates a rack-thrust-force deviation value $\Delta F_R$ from the following equation (25) and outputs the rack-thrust-force deviation value $\Delta F_R$ to the road-surface friction-coefficient estimating portion 1j.

$$\Delta F_R = |F_E - F_R| \tag{25}$$

The road-surface friction-coefficient estimating portion 1j is provided as a road-surface friction-coefficient estimating portion in the road-surface friction-coefficient estimating unit and as restoring-speed setting unit. The road-surface friction-coefficient estimating portion 1j receives the vehicle speed V from the vehicle-speed calculating portion 1a, the front-wheel slip angle $\beta_f$ from the front-wheel slip-angle calculating portion 1b, and the front-wheel friction-circle utilization rate $r_f$ from the front-wheel friction-circle utilization-rate calculating portion 1f, and also receives the rack-thrust-force deviation value $\Delta F_R$ from the rack-thrust-force deviation calculating portion 1i.

The road-surface friction-coefficient estimating portion 1j then compares the rack-thrust-force deviation value $\Delta F_R$ with a preliminarily set maximum-value-determination threshold value $\mu_{maxa}$. If the rack-thrust-force deviation value $\Delta F_R$ is above or equal to the maximum-value-determination threshold value $\mu_{maxa}$, the road-surface friction-coefficient estimating portion 1j determines that the tires are slipping, and sets the front-wheel friction-circle utilization rate $r_f$ in that state as a road-surface friction coefficient $\mu$. If the rack-thrust-force deviation value $\Delta F_R$ is below the maximum-value-determination threshold value $\mu_{maxa}$, the road-surface friction-coefficient estimating portion 1j refers to a preliminarily set map (an example of which is shown in FIG. 4) in order to determine a restoring speed $V_\mu$ at which a road-surface friction coefficient $\mu$ is to be restored to a preliminarily set value (such as 1.0) based on the vehicle speed V and the front-wheel slip angle $\beta_f$. While restoring the road-surface friction coefficient at the restoring speed $V_\mu$, the road-surface friction-coefficient estimating portion 1j calculates and outputs the road-surface friction coefficient $\mu$.

The maximum-value-determination threshold value $\mu_{maxa}$ may be set to a large value in accordance with an absolute value of the lateral acceleration ($d^2y/dt^2$).

Referring to FIG. 4, the map for determining the restoring speed $V_\mu$ has characteristics in which the restoring speed $V_\mu$ decreases as the vehicle speed V increases and also as the front-wheel slip angle $\beta_f$ becomes higher.

If the vehicle is a two-wheel-drive model, a steering-stability capacity $\omega n \cdot \zeta$ that determines the steering stability of the vehicle can be determined from the following equation (26). It can be said that the vehicle convergence becomes higher with increasing steering-stability capacity $\omega n \cdot \zeta$.

$$\omega n \cdot \zeta = (a11 + a22)/2 \tag{26}$$

Here, both a11 and a22 have been described above in the equation (9). It is known that the a11 term contributes to the convergence of the vehicle slip angle. The more this term changes linearly, the higher the vehicle stability becomes and the more the responsiveness accords with the driver's operational feel. On the other hand, the a22 term corresponds to a system matrix element that has an effect on yaw convergence, and becomes a negative feedback gain of a yaw rate.

Considering the nonlinearity of the tires simply as quadratic equations, the a11 and a22 terms can be expressed with the following equations (27) and (28):

$$a11 = (1/(m \cdot V)) \cdot (2 \cdot (K_f + K_r) - \tag{27}$$
$$((K_f^2/(\mu^2 \cdot F_{zf}^2 - F_{xf}^2)^{1/2} \cdot |\beta_f| + (K_r^2/(\mu^2 \cdot F_{zr}^2 - F_{xr}^2)^{1/2} \cdot |\beta_r|))$$

$$a22 = (1/(I_z \cdot V)) \cdot \tag{28}$$
$$(2 \cdot (L_f^2 \cdot K_f + L_r^2 \cdot K_r) - ((L_f^2 \cdot K_f^2/(\mu^2 \cdot F_{zf}^2 - F_{xf}^2)^{1/2} \cdot |\beta_f| +$$
$$(L_r^2 \cdot K_r^2/(\mu^2 \cdot F_{zr}^2 - F_{xr}^2)^{1/2} \cdot |\beta_r|))$$

where $F_{zr}$ indicates a rear-wheel ground load, and $F_{xr}$ indicates a rear-wheel longitudinal force.

Figure 5A:
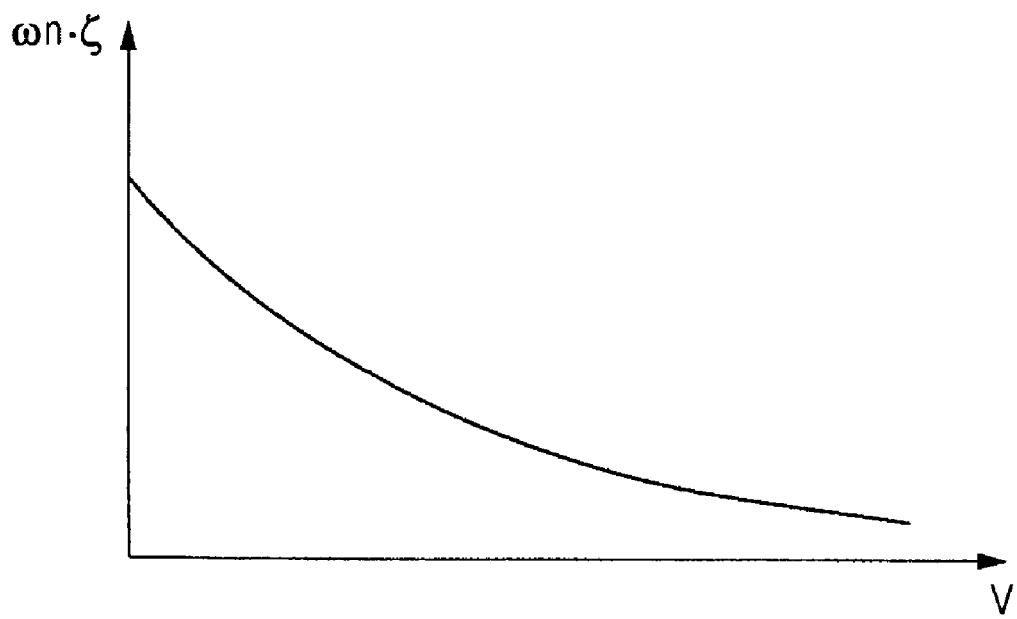
FIG. 5A illustrates a relationship between a steering-stability capacity and a vehicle speed and FIG. 5B illustrates a relationship between a steering-stability capacity and a slip angle.

As is apparent from the aforementioned equations (27) and (28), the a11 term and the a22 term both decrease with increasing vehicle speed V, which means that the steering-stability capacity $\omega n \cdot \zeta$ decreases with increasing vehicle speed V (see FIG. 5A). In view of this, the characteristics are set such that the restoring speed $V_\mu$ decreases as the vehicle speed V becomes higher, so as to minimize drastic changes.

Figure 5B:
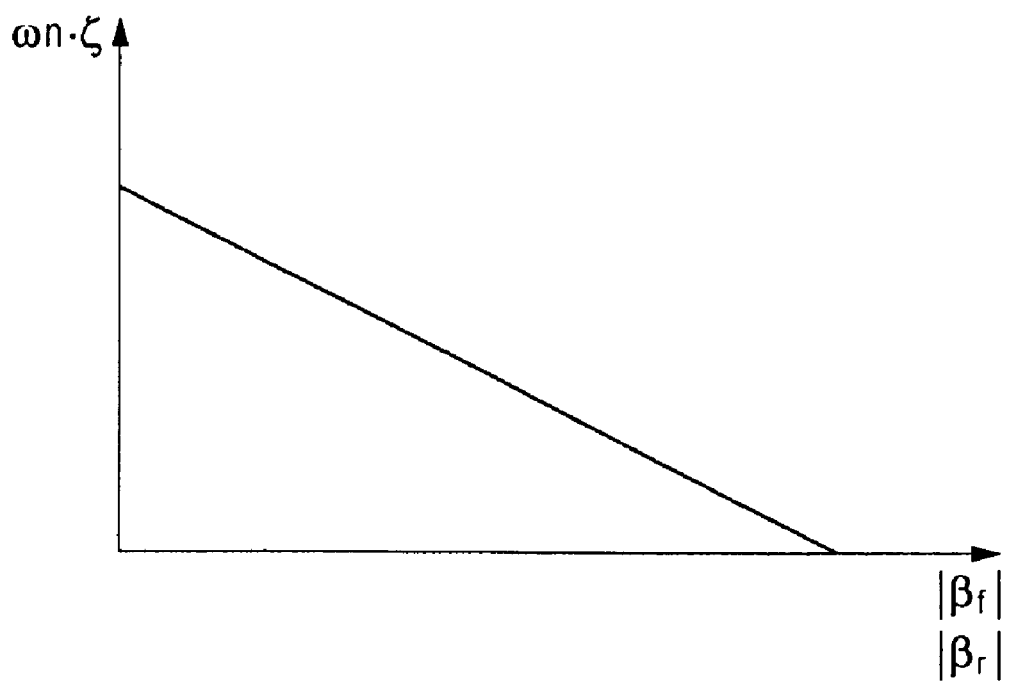

Likewise, it is apparent from the aforementioned equations (27) and (28) that the a11 and a22 terms decrease as the front-wheel slip angle $\beta_f$ becomes higher, which means that the steering-stability capacity $\omega n \cdot \zeta$ decreases with increasing front-wheel slip angle $\beta_f$ (see FIG. 5B). In view of this, the characteristics are set such that the restoring speed $V_\mu$ decreases as the front-wheel slip angle $\beta_f$ becomes higher, so as to minimize drastic changes.

Although the restoring speed $V_\mu$ is set using the front-wheel slip angle $\beta_f$ in this embodiment, the restoring speed $V_\mu$ may alternatively be set using a rear-wheel slip angle $\beta_r$, as is apparent from the aforementioned equations (27) and (28).

The road-surface friction-coefficient estimating program performed by the road-surface friction-coefficient estimating device 1 will now be described with reference to the flow chart in FIG. 2.

First, in step S101, required parameters are read, which include wheel speeds $\omega_{fl}$, $\omega_{fr}$, $\omega_{rl}$, and $\omega_{rr}$ of the four individual wheels, a steering-wheel angle $\theta_H$, a yaw rate $\gamma$, an engine torque $T_{eg}$, an engine speed $N_e$, a main transmission gear ratio i, a turbine speed $N_t$ of a torque converter, a tightening torque $T_{LSD}$ of a limited-slip differential clutch, a lateral acceleration ($d^2y/dt^2$), a driver steering force $F_d$, and an assist force $F_{EPS}$ by electric power steering.

In step S102, the vehicle-speed calculating portion 1a calculates an average of the wheel speeds $\omega_{fl}$, $\omega_{fr}$, $\omega_{rl}$, and $\omega_{rr}$ in order to determine a vehicle speed V.

In step S103, the front-wheel slip-angle calculating portion 1b solves the aforementioned equation (9) to determine a vehicle slip angle $\beta$, and substitutes the vehicle slip angle $\beta$ into the aforementioned equation (7) to determine a front-wheel slip angle $\beta_f$.

In step S104, the front-wheel ground-load calculating portion 1c calculates a front-wheel ground load $F_{zf}$ from the aforementioned equation (10).

In step S105, the front-wheel longitudinal-force calculating portion 1d calculates a front-wheel longitudinal force $F_{xf}$ from any one of the aforementioned equations (18) to (20).

In step S106, the front-wheel lateral-force calculating portion 1e calculates a front-wheel lateral force $F_{yf}$ from the aforementioned equation (21).

In step S107, the front-wheel friction-circle utilization-rate calculating portion 1f calculates a front-wheel friction-circle utilization rate $r_f$ from the aforementioned equation (22).

In step S108, the presumptive rack-thrust-force calculating portion 1g calculates a presumptive rack thrust force $F_E$ from the aforementioned equation (23).

In step S109, the reference rack-thrust-force calculating portion 1h calculates a reference rack thrust force $F_R$ from the aforementioned equation (24).

In step S110, the rack-thrust-force deviation calculating portion 1i calculates a rack-thrust-force deviation value $\Delta F_R$ from the aforementioned equation (25).

Steps S111 onward are performed by the road-surface friction-coefficient estimating portion 1j. First, in step S111, the road-surface friction-coefficient estimating portion 1j compares the rack-thrust-force deviation value $\Delta F_R$ with a maximum-value-determination threshold value $\mu_{maxa}$. If the rack-thrust-force deviation value $\Delta F_R$ is above or equal to the maximum-value-determination threshold value $\mu_{maxa}$ ($\Delta F_R \geq \mu_{maxa}$), the road-surface friction-coefficient estimating portion 1j determines that the tires are slipping. In that case, the operation proceeds to step S112 where the road-surface friction-coefficient estimating portion 1j sets the front-wheel friction-circle utilization rate $r_f$ in that state as a road-surface friction coefficient $\mu$.

In contrast, if $\Delta F_R < \mu_{maxa}$, the operation proceeds to step S113 where the road-surface friction-coefficient estimating portion 1j refers to a preliminarily set map (the example of which is shown in FIG. 4) in order to determine a restoring speed $V_\mu$ at which a road-surface friction coefficient $\mu$ is to be restored to a preliminarily set value (such as 1.0) based on the vehicle speed V and the front-wheel slip angle $\beta_f$. In step S114, while restoring the road-surface friction coefficient to the preliminarily set value (such as 1.0) at the restoring speed $V_\mu$, the road-surface friction-coefficient estimating portion 1j calculates a road-surface friction coefficient $\mu$.

After the road-surface friction coefficient $\mu$ is set in step S112 or S114, the operation proceeds to step S115 where the road-surface friction-coefficient estimating portion 1j outputs the road-surface friction coefficient $\mu$. Finally, this exits the program.

An example of road-surface friction-coefficient estimation will be described below with reference to the timing diagram in FIG. 6.

A state of $\Delta F_R < \mu_{maxa}$ is maintained up to time t1. In this state, the road-surface friction coefficient $\mu$ is stably set at 1.0.

The aforementioned state changes to a state of $\Delta F_R \geq \mu_{maxa}$ in a period between time t1 and time t2. In this state, it is determined that the tires are slipping, and the front-wheel friction-circle utilization rate $r_f$ in this state is set as a road-surface friction coefficient $\mu$.

Subsequently, the state of $\Delta F_R < \mu_{maxa}$ is recovered in a period between time t2 and time t3, and as the road-surface friction coefficient is restored to 1.0 at the restoring speed $V_\mu$, a road-surface friction coefficient $\mu$ is set.

As described above, in this embodiment, the rack-thrust-force deviation value $\Delta F_R$ and the preliminarily set maximum-value-determination threshold value $\mu_{maxa}$ are compared with each other. When the rack-thrust-force deviation value $\Delta F_R$ is above or equal to the maximum-value-determination threshold value $\mu_{maxa}$, it is determined that the tires are slipping, and the front-wheel friction-circle utilization rate $r_f$ in that state is set as a road-surface friction coefficient $\mu$. On the other hand, when the rack-thrust-force deviation value $\Delta F_R$ is below the maximum-value-determination threshold value $\mu_{maxa}$, a restoring speed $V_\mu$ at which a road-surface friction coefficient $\mu$ is to be restored to a preliminarily set value (such as 1.0) based on the vehicle speed V and the front-wheel slip angle $\beta_f$ is determined by referring to a preliminarily set map. While the road-surface friction coefficient is restored at the restoring speed V, a road-surface friction coefficient $\mu$ is calculated and output. Consequently, in a case where it is determined that the tires are slipping, the road-surface friction coefficient $\mu$ is appropriately set to a low value in accordance with the front-wheel friction-circle utilization rate $r_f$ in that state. In cases other than the above, a road-surface friction coefficient $\mu$ is set while the road-surface friction coefficient is restored to 1.0, so that the road-surface friction coefficient $\mu$ can be appropriately set without being maintained at a low value. Accordingly, even if estimation of a road-surface friction coefficient is difficult, an appropriate road-surface friction coefficient can be set, whereby the potential that vehicle behavior control has can be exhibited to a maximum extent.

Furthermore, since a restoring speed at which a road-surface friction coefficient is to be restored to 1.0 is adjustable in accordance with the vehicle speed V and the front-wheel slip angle $\beta_f$ in view of steering-stability capacity $\omega n \cdot \zeta$ related to the convergence of vehicle behavior, a road-surface friction coefficient $\mu$ can be set naturally and smoothly while the vehicle stability is maintained at high level.

In the above embodiment of the present invention, estimation of a road-surface friction coefficient is implemented by restoring the road-surface friction coefficient to a front-wheel friction-circle utilization rate $r_f$ or a preliminarily set value (such as 1.0) based on the deviation $\Delta F_R$ relationship between the presumptive rack thrust force $F_E$ and the reference rack thrust force $F_R$. It is needless to say that this estimation according to the above embodiment of the present invention can be applied to other road-surface friction-coefficient estimating devices. For example, with regard to a technology for estimating a road-surface friction coefficient from, for example, a steering angle, a vehicle speed, and a yaw rate using an adaptive control theory proposed by the present applicant in Japanese Unexamined Patent Application Publication No. 8-2274, if a condition where road-surface friction-coefficient estimation is not possible (such as when the steering angle is 0°) is detected, a restoring speed $V_\mu$ at which a road-surface friction coefficient μ is to be restored to a preliminarily set value (such as 1.0) based on the vehicle speed V and the front-wheel slip angle $β_f$ may be determined by referring to a preliminarily set map. Subsequently, while the road-surface friction coefficient is restored at the restoring speed $V_μ$, a road-surface friction coefficient μ may be calculated and output. Similarly, the estimation according to the above embodiment of the present invention can be applied to other estimating methods, such as the one disclosed in Japanese Unexamined Patent Application Publication No. 2000-71968 by the present applicant in which a road-surface friction coefficient is estimated by using an observer.

What is claimed is:

1. A road-surface friction-coefficient estimating device for a vehicle, for estimating a friction coefficient of a road surface on which the vehicle is traveling, comprising:
   a vehicle-speed detecting unit configured to detect a vehicle speed;
   a vehicle-wheel slip-angle detecting unit configured to detect a slip angle of a wheel;
   a restoring-speed setting unit configured to set a restoring speed at which a road-surface friction coefficient is to be restored to a preliminarily set value based on the vehicle speed and the slip angle of the wheel; and
   a road-surface friction-coefficient estimating unit configured to estimate the road-surface friction coefficient by allowing a previously estimated value of the road-surface friction coefficient to be restored to the set value at the restoring speed, wherein the road-surface friction-coefficient estimating unit includes:
   a presumptive rack-thrust-force estimating portion configured to estimate a presumptive rack thrust force presumably being generated in actuality;
   a reference rack-thrust-force estimating portion configured to estimate a reference rack thrust force expected to be generated;
   a tire-force estimating portion configured to estimate a tire force acting on the wheel; a friction-circle utilization-rate calculating portion configured to calculate a friction-circle utilization rate on the basis of the tire force; and
   a road-surface friction-coefficient estimating portion configured to set the friction-circle utilization rate as the road-surface friction coefficient when an absolute value of deviation between the presumptive rack thrust force and the reference rack thrust force is above a preliminarily set threshold value, and to estimate the road-surface friction coefficient by allowing a previously estimated value of the road-surface friction coefficient to be restored to the set value at the restoring speed when the absolute value of deviation is below the threshold value.

2. The road-surface friction-coefficient estimating device according to claim 1, wherein the restoring speed decreases as the vehicle speed increases.

3. The road-surface friction-coefficient estimating device according to claim 1, wherein the restoring speed decreases as the slip angle of the wheel becomes higher.

4. The road-surface friction-coefficient estimating device according to claim 1, wherein the preliminarily set value is 1.0.

5. The road-surface friction-coefficient estimating device according to claim 1, wherein the preliminarily set threshold value is adjusted in value in accordance with an absolute value of a lateral acceleration of the vehicle.

6. A road-surface friction-coefficient estimating device for a vehicle, for estimating a friction coefficient of a road surface on which the vehicle is traveling, comprising:
   a vehicle speed detecting unit configured to detect a vehicle speed;
   a vehicle wheel slip angle detecting unit configured to detect a slip angle of a wheel;
   a change rate setting unit configured to set a change rate of a road-surface friction coefficient based on the vehicle speed and the slip angle of the wheel; and
   a road-surface friction-coefficient estimating unit configured to estimate the road-surface friction coefficient by increasing a previously estimated value of the road-surface friction coefficient at the change rate to provide for restoration of the estimated road-surface friction coefficient to a preliminary set estimated road-surface friction coefficient value, wherein the road-surface friction-coefficient estimating unit includes;
   a presumptive rack-thrust-force estimating portion configured to estimate a presumptive rack thrust force presumably being generated in actuality;
   a reference rack-thrust-force estimating portion configured to estimate a reference rack thrust force expected to be generated;
   a tire-force estimating portion configured to estimate a tire force acting on the wheel; a friction-circle utilization-rate calculating portion configured to calculate a friction-circle utilization rate on the basis of the tire force; and
   wherein the road-surface friction-coefficient estimating unit is configured to set the friction-circle utilization rate as the road-surface friction coefficient when an absolute value of deviation between the presumptive rack thrust force and the reference rack thrust force is above a preliminarily set threshold value, and to estimate the road-surface friction coefficient by allowing a previously estimated value of the road-surface friction coefficient to be restored by way of the change rate determined to the preliminary set estimated road surface friction coefficient value when the absolute value of deviation is below the threshold value, and wherein the presumptive rack-thrust-force estimating portion is configured to estimate a presumptive rack thrust force presumably being generated in actuality both during a turning of a steering wheel from an initial steering wheel setting and during an hysteresis return of the steering wheel toward the initial steering wheel setting.

7. The road surface friction-coefficient estimating device of claim 1 wherein said vehicle-speed detecting unit comprises a vehicle speed sensor.

8. The road surface friction-coefficient estimating device of claim 6 wherein said vehicle-speed detecting unit comprises a vehicle speed sensor.

9. A vehicle, comprising:
   the road-surface friction-coefficient estimating device of claim 1; and
   a plurality of wheels, and
   wherein said vehicle-speed detecting unit comprises wheel speed sensors.

10. A vehicle, comprising:
    the road-surface friction-coefficient estimating device of claim 6; and
    a plurality of wheels, and
    wherein said vehicle-speed detecting unit comprises wheel speed sensors.

11. A road-surface friction-coefficient estimating device, comprising:
    a vehicle-speed detecting unit configured to detect a vehicle speed;

a vehicle-wheel slip-angle detecting unit configured to detect a slip angle of a wheel;

a restoring-speed setting unit configured to set a restoring speed at which a road-surface friction coefficient is to be restored to a preliminarily set value based on the vehicle speed and the slip angle of the wheel;

a road-surface friction-coefficient estimating unit configured to estimate the road-surface friction coefficient by allowing a previously estimated value of the road-surface friction coefficient to be restored to the set value at the restoring speed; and a vehicle control unit which is in communication with said road surface friction-coefficient estimating unit and receives said road-surface friction coefficient upon output by said road-surface friction-coefficient estimating unit, wherein the road-surface friction-coefficient estimating unit includes:

a presumptive rack-thrust-force estimating portion configured to estimate a presumptive rack thrust force presumably being generated in actuality;

a reference rack-thrust-force estimating portion configured to estimate a reference rack thrust force expected to be generated;

a tire-force estimating portion configured to estimate a tire force acting on the wheel;

a friction-circle utilization-rate calculating portion configured to calculate a friction-circle utilization rate on the basis of the tire force; and wherein the road-surface friction-coefficient estimating unit is configured to set the friction-circle utilization rate as the road-surface friction coefficient when an absolute value of deviation between the presumptive rack thrust force and the reference rack thrust force is above a preliminarily set threshold value, and to estimate the road-surface friction coefficient by allowing a previously estimated value of the road-surface friction coefficient to be restored to the set value at the restoring speed when the absolute value of deviation is below the threshold value, and wherein the presumptive rack-thrust-force estimating portion is configured to estimate a presumptive rack thrust force presumably being generated in actuality both during a turning of a steering wheel from an initial steering wheel setting and during an hysteresis return of the steering wheel toward the initial steering wheel setting.

12. The road-surface friction-coefficient estimating device of claim 11 wherein the vehicle control unit is a torque distribution control unit.

13. The road-surface friction-coefficient estimating device of claim 1 wherein the restoring-speed setting unit has accessible reference information for use in determining the restoration speed to be set, and which reference information is configured as to have the restoring speed decrease as the vehicle speed increases and to have the restoring speed decrease as the slip angle increases.

14. The road-surface friction-coefficient estimating device of claim 13 wherein the accessible reference information includes a stored data map of information.

15. The road-surface friction-coefficient estimating device of claim 6 wherein the change rate setting unit has accessible reference information for use in determining the change rate to be set, and which reference information is configured as to have the change rate decrease as the vehicle speed increases and to have the change rate decrease as the slip angle increases.

16. The road-surface friction-coefficient estimating device of claim 11 wherein the restoring-speed setting unit has accessible reference information for use in determining the restoration speed to be set, and which reference information is configured as to have the restoring speed decrease as the vehicle speed increases and to have the restoring speed decrease as the slip angle increases.

17. The road-surface friction-coefficient estimating device of claim 1 wherein the presumptive rack-thrust-force estimating portion is configured to estimate a presumptive rack thrust force presumably being generated in actuality both during a turning of a steering wheel from an initial steering wheel setting and during a hysteresis return of the steering wheel toward the initial steering wheel setting.

* * * * *